US012552244B2

(12) United States Patent
Hall et al.

(10) Patent No.: US 12,552,244 B2
(45) Date of Patent: Feb. 17, 2026

(54) ACTIVE AERO SHUTTER FOR A MOTOR VEHICLE

(71) Applicant: Wuhan Lotus Cars Co., Ltd., Wuhan (CN)

(72) Inventors: Philip Hall, Raunheim (DE); Thomas Wiech, Darmstadt (DE); Falk Fritz, Raunheim (DE); Alexander Neumann, Gernsheim (DE)

(73) Assignee: Wuhan Lotus Cars Co., Ltd., Wuhan (CN)

( * ) Notice: Subject to any disclaimer, the term of this patent is extended or adjusted under 35 U.S.C. 154(b) by 282 days.

(21) Appl. No.: 18/263,331

(22) PCT Filed: Jan. 29, 2021

(86) PCT No.: PCT/EP2021/052161
§ 371 (c)(1),
(2) Date: Jul. 27, 2023

(87) PCT Pub. No.: WO2022/161621
PCT Pub. Date: Aug. 4, 2022

(65) Prior Publication Data
US 2024/0317042 A1    Sep. 26, 2024

(51) Int. Cl.
*B60K 11/08*    (2006.01)
(52) U.S. Cl.
CPC .................. *B60K 11/085* (2013.01)
(58) Field of Classification Search
CPC .............................. B60K 11/085; B60K 11/08
USPC ....................................................... 180/68.1
See application file for complete search history.

(56) References Cited

U.S. PATENT DOCUMENTS

| 9,827,847 B1* | 11/2017 | Hanna ................... B60K 11/085 |
| 10,071,625 B1 | 9/2018 | Stoddard et al. |
| 10,730,384 B1* | 8/2020 | Klop .................... B60K 11/085 |
| 10,899,222 B2 | 1/2021 | Kondo |
| 2013/0012115 A1* | 1/2013 | Schwarz .............. B60K 11/085 454/155 |
| 2013/0068403 A1* | 3/2013 | Fenchak .............. B60K 11/085 160/218 |

(Continued)

FOREIGN PATENT DOCUMENTS

| CN | 113043838 A | 6/2021 |
| EP | 2407333 A1 | 1/2012 |

(Continued)

OTHER PUBLICATIONS

International Search Report and Written Opinion of the International Searching Authority for International Application No. PCT/EP2021/052161, mailed on Oct. 26, 2021, in 12 pages.

*Primary Examiner* — Hau V Phan
(74) *Attorney, Agent, or Firm* — JCIPRNET

(57) ABSTRACT

The invention refers to an active aero shutter for a motor vehicle, comprising a frame with openings through which air can flow, at least one closing plate in each opening, which closes the opening and stops the air flow when closed, and the frame is formed by several struts, each connected to at least one other strut, wherein each closing plate is pivoted with a hinge on a basic strut. As the active aero shutter according to the invention has counterrotating closing plates which are rotating in several angles it is possible to explore new design concepts and ensure driving performance.

15 Claims, 4 Drawing Sheets

(56) References Cited

U.S. PATENT DOCUMENTS

| | | | |
|---|---|---|---|
| 2014/0039762 A1* | 2/2014 | D'Silva | B62D 6/008 701/42 |
| 2014/0102817 A1* | 4/2014 | Asano | B60K 11/085 180/68.1 |
| 2014/0216834 A1* | 8/2014 | Elliott | B60K 11/085 180/68.1 |
| 2014/0231161 A1* | 8/2014 | Lehti | B62D 25/105 180/68.1 |
| 2014/0273806 A1* | 9/2014 | Frayer, III | B60K 11/085 454/335 |
| 2016/0363132 A1* | 12/2016 | Havel | F04D 25/06 |
| 2017/0203649 A1* | 7/2017 | Jakobs | B60K 11/085 |
| 2019/0118643 A1* | 4/2019 | Momii | B60K 11/085 |

FOREIGN PATENT DOCUMENTS

| | | |
|---|---|---|
| EP | 3235673 A1 | 10/2017 |
| FR | 3029859 A1 | 6/2016 |
| JP | 2012-35829 A | 2/2012 |
| KR | 2011-0029370 A | 3/2011 |
| KR | 2021-0060882 A | 5/2021 |
| WO | WO 2020/127871 A1 | 6/2020 |

\* cited by examiner

ACTIVE AERO SHUTTER FOR A MOTOR VEHICLE

CROSS-REFERENCE TO RELATED APPLICATIONS

This application is the U.S. National Phase under 35 U.S.C. § 371 of International Application No. PCT/EP2021/052161, filed Jan. 29, 2021, titled ACTIVE AERO SHUTTER FOR A MOTOR VEHICLE, the entirety of each of which is hereby expressly incorporated by reference herein.

BACKGROUND

Field

The invention relates to an active aero shutter for a motor vehicle.

Description of the Related Art

Shutters near the grille of the vehicle adjust the air resistance to the current driving situation: The air resistance is lower, when they are closed. As a result, fuel consumption is lower. With the vanes open, the grille shutters enable maximum cooling of the engine compartment and assists the a/c-system. Typically an Active Grille Shutters consists of several vanes which are connected to each other and rotate in the same direction. The vanes are oriented either vertically or horizontally and all rotate around either a horizontal or a vertical axis. In many active aero shutters the vanes also all move at the same time to either an open or a closed position as all vanes are linked to one and the same drive link. Based on the either horizontal or vertical movement of the vanes the shutter design possibilities are limited.

WO 2014/150140 A1 discloses a vehicle grille shutter that two louvers and a drive link. The first louver is mounted about a first rotational axis, while the second louver is mounted about a second rotational axis. The two rotational axes are angled relative to each other. The drive link is connected to the first and second louvers and transmits a rotational motion of the first louver to the second louver.

SUMMARY

The object of the invention is to provide an active aero shutter which overcomes the aforementioned disadvantages and which in particular provides an improved drag performance and opens new possibilities for the shutter design.

The invention provides an active aero shutter for a motor vehicle, comprising:
- a frame with openings through which air can flow,
- at least one closing plate in each opening, which closes the opening and stops the air flow when closed.

The frame is formed by several struts, each connected to at least one other strut. The frame comprises at least one basic strut. Each closing plate is pivoted with a hinge on a basic strut.

On each basic strut a closing plate is mounted with a separate hinge and each strut forms a rotational axis. The rotational axes of two adjacent closing plates are angled relative to each other, wherein the angle between the axes corresponds to the angle between the struts.

In one example, every two adjacent closing plates have different rotation axes and rotate in two different angles.

The active aero shutter according to the invention has counterrotating closing plates, which are rotating in several angles. Counterrotating of two corresponding or similar moving closing plates means that they are rotating in opposite directions and are not all oriented either vertically or horizontally.

In one example, two counter-rotating closing plates are mounted on at least one basic strut with separate hinges.

The active aero shutter is configured to selectively assume a closed state and an open state, the closed state being a state where the closing plates are each positioned so as to close the opening in a vehicle front, the open state being a state where the closing plates have been moved from respective positions in the closed state to positions pointing to the inside of the vehicle and clearing the openings.

According to an exemplary embodiment, the frame comprises at least six basic struts and each basic strut intersects with one other basic strut at a point of intersection. The frame further has at least six middle struts, which are each connected to at least one basic strut at a point of intersection.

Each opening of the frame may preferably be built by three struts connected to each other forming a triangle, preferably an isosceles triangle. The triangle may preferably be built from one basic strut and two middle struts. An isosceles triangle is a triangle that has two sides of equal length.

According to another exemplary embodiment the frame may at least be partially hexagonal in shape and the basic struts may preferably form a honeycomb structure.

The closing plates may preferably have the same shape as the openings and each opening may preferably be closed by exactly one closing plate.

In an embodiment of the invention each closing plate is connected independently to an opening device. The opening device may in one embodiment be a linear slider.

In another embodiment of the invention the opening device may be a hinge mechanism having at least one drive lever and at least one rod and each closing plate may be connected by a rod to the drive lever, preferably each closing plate is connected independently by a rod to the drive lever. Preferably, the hinge mechanism may further comprise an actuation shaft which is connected to an actuator and the drive lever is on one end connected to the actuation shaft. If, for example, the drive lever is spited more actuators may be used to control different segments independently.

In one exemplary embodiment each closing plate may be connected independently by a rod to the drive lever. Thus, the movement of the closing plates is synchronized as they are all connected to one drive lever and are all moved when the drive lever is moved.

In an embodiment of the invention with a hinge mechanism the hinge mechanism comprises one drive lever and all closing plates are connected to the one drive lever. The drive lever conducts a linear motion to close and open the closing plates. The linear motion of the drive lever is transformed to a rotational movement of the closing plates.

In another embodiment of the invention with a hinge mechanism the hinge mechanism comprises two drive levers that are mounted on opposite sides of the active aero shutters.

In one example, the actuator may be used to vary opening angles of the closing plates to adjust the airflow, thereby controlling the cooling efficiency. The actuator turns the actuator shaft raising the drive lever which will open or close the connected closing plates simultaneously to adjust airflow from the front of the vehicle. The actuation shaft may consist of one or more elements, for example two or three separate elements.

As the active aero shutter according to the invention has counterrotating closing plates which are rotating in several angles it is possible to explore new design possibilities and ensure driving performance. Especially it is possible to ensure low drag targets and ensures maximum drag performance.

BRIEF DESCRIPTION OF THE DRAWINGS

The following description of exemplary embodiments, the wording of the claims and the drawings provide further features, details and advantages of the invention. The figures show:

DETAILED DESCRIPTION

Figure 1:
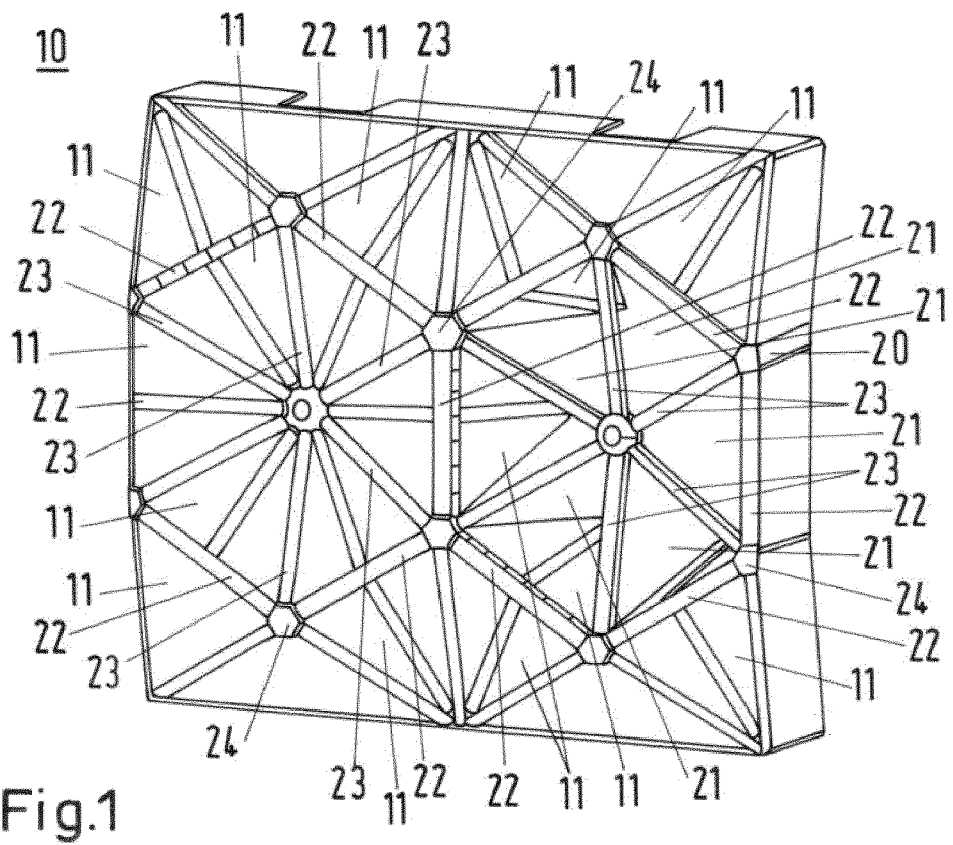
FIG. 1 a schematic drawing of an active aero shutter with closed and open portions, FIG. 2 a backside of one embodiment of an active grille shutter, FIG. 3 a schematic drawing of an active aero shutter of a second embodiment, FIG. 4 a schematic side view of the hinge mechanism of the second embodiment and FIG. 5 a schematic side view of a hinge mechanism of another embodiment.

FIG. 1 shows the front side of an active aero shutter 10 for a motor vehicle having a frame 20 with openings 21 through which air can flow. Each opening 21 is provided with a closing plate 11 which can close the opening 21 and stop the airflow. The frame 20 is built from several interconnected basic struts 22 forming a honeycomb structure. Two basic struts 22 intersect at a point of intersection 24. The frame 20 further has several middle struts 23 which are connect to a basic strut 22 at a point of intersection 24. An opening 21 is built by three struts connected to each other forming an isosceles triangle.

The closing plates 11 have the same shape as the openings 21 and all have the form of an isosceles triangle. Each closing plate 11 is pivoted on one basic strut 22 of the frame. The basic strut 22 provides an axis around which the closing plate 11 can rotate to move from the open to the closed state. The active aero shutter 10 in FIG. 1 has two ventilation areas each having ten openings 21 and ten closing plates 11. The ventilation area on the left side is shown in the closed state. The six closing plates 11 in the middle are oriented in a hexagon pattern in a honeycomb structure of the frame 20 while the four additional closing plates 11 at the rear are aligned to the frame with the basic side of the triangle and their peaks are pointing to the surrounding part of the vehicle. The second ventilation area on the right side is shown in a partially open position. The six closing plates 11 in the middle are open while the four additional closing plates 11 at the rear remain closed. As shown in FIG. 1 the six closing plates 11 have been rotated in opposite directions to uncover the openings 21.

Figure 2:
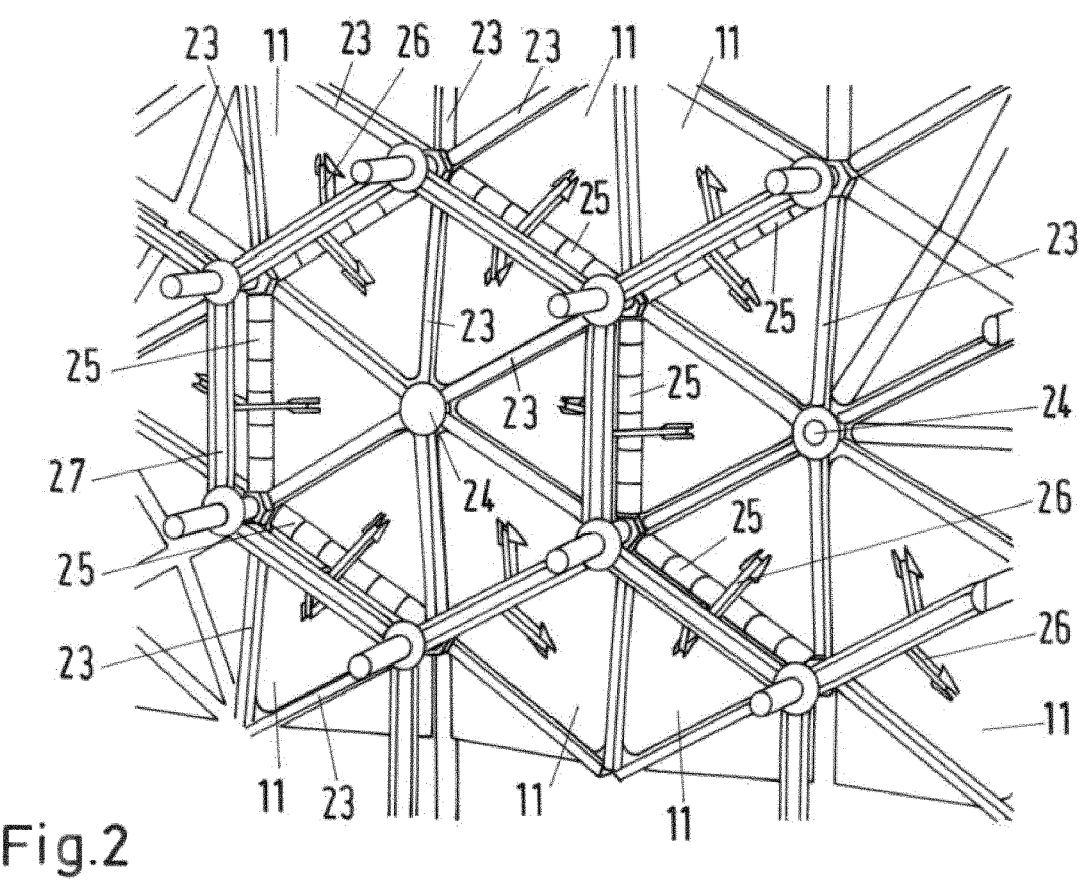

FIG. 2 shows a backside of one embodiment of an active grille shutter according to the invention. All closing plates 11 are in the closed position. The closing plates 11 are mounted on the struts of the frame via hinges 25, each closing plate 11 mounted with a separate hinge 25. On each basic struts two counter-rotating closing plates 11 are mounted with a hinge 25. Each closing plate is connected to a linear slider 26. Each linear slider 26 moves one closing plate 11 from the closed position to the open position. The linear sliders 26 are attached to a mounting frame 27 having the same structure as the struts 22 of the frame 20.

Figure 3:
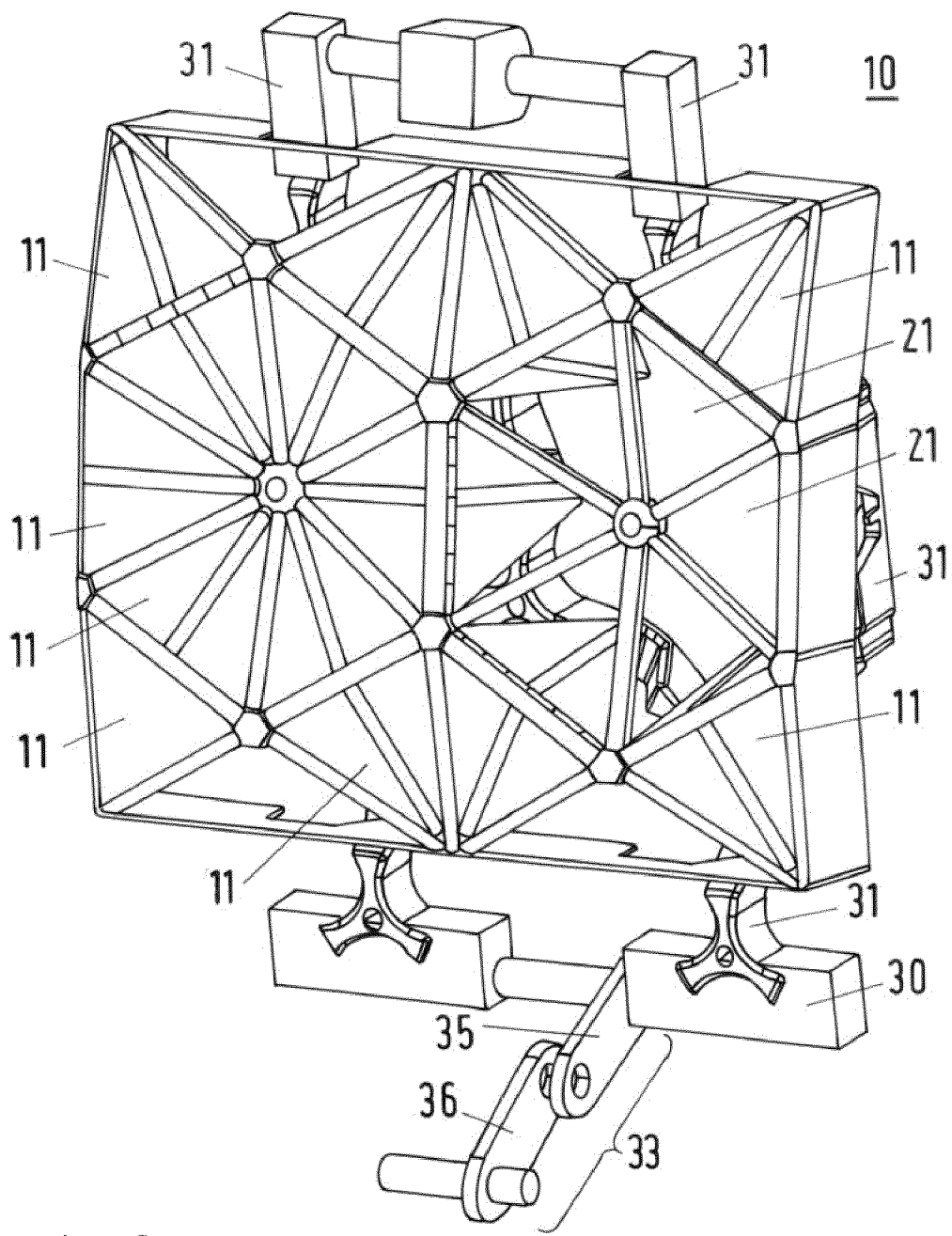

FIG. 3 shows a second embodiment of the active aero shutter according to the invention from the front side. The frame 10 has the same basic structures as show in FIG. 1. The closing plates 11 are opened and closed by a hinge mechanism 30. The hinge mechanism containing several rods (not shown) attached to the closing plates 11 and drive levers 31 on which the rods are mounted. The hinge mechanism further has an actuation shaft 33 which is connected to an actuator (not shown). The actuations shaft 33 has two shaft elements 35,36 that are connected to each other in a hinge 37.

Figure 4A:
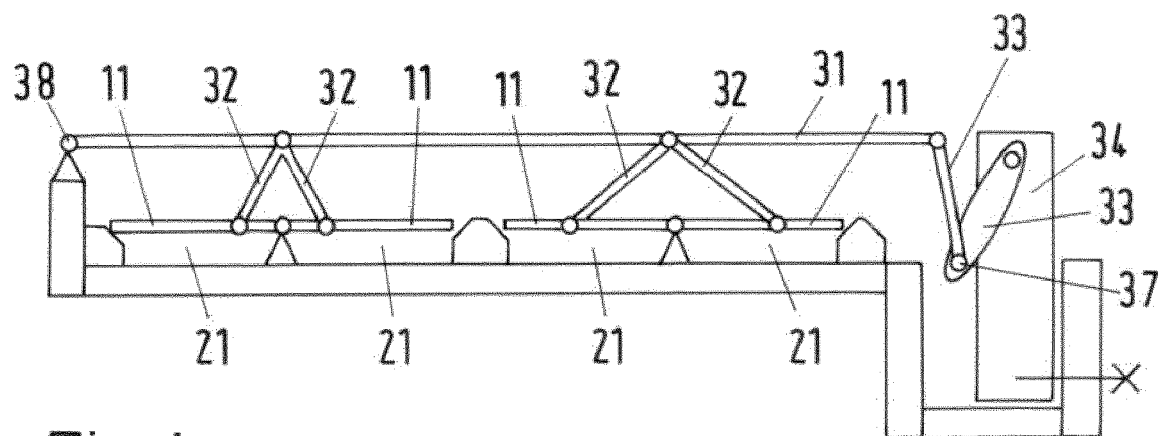
Figure 4B:
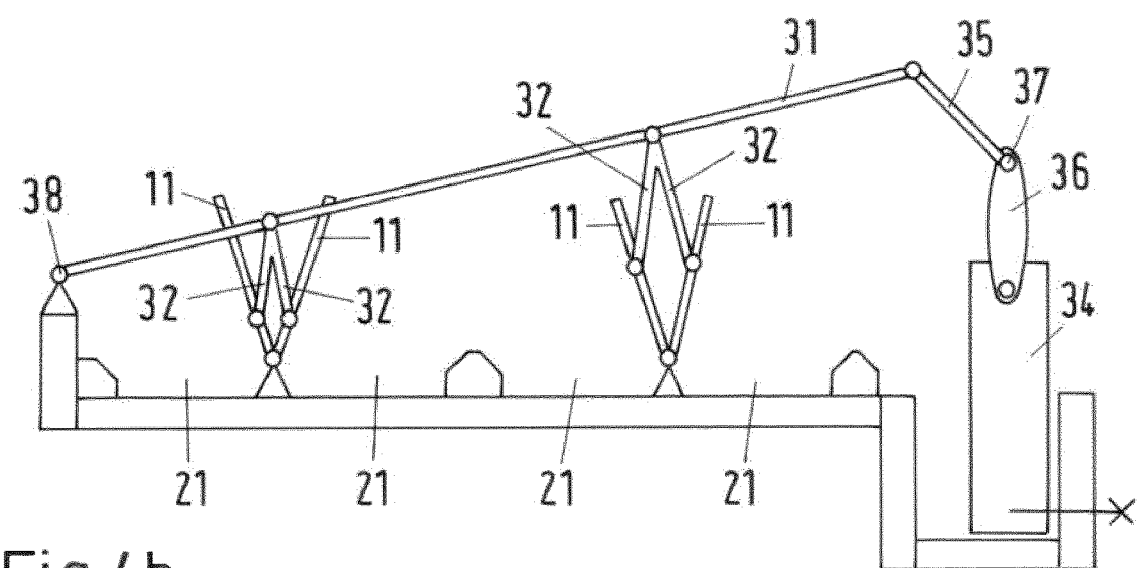

FIG. 4 shows a schematic drawing of the hinge mechanism in a side view. FIG. 4 a shows the active shutter in a close state. Four openings 21 are each closed by a closing plate 11. Each closing plate is attached to a rod 32. All four rods 32 are connected to a drive lever 31 such that the closing plates 11 are moved in unison but in different directions. The drive lever 31 is connected to an actuation shaft 33 which two shaft elements 35, 36 hinged to each other. The actuation shaft 33 is coupled to an actuator 34. FIG. 4*b* shows the same active shutter in an open state. The four closing plates 11 are in the open state giving the openings 21 free that air can flow through them. The actuator 34 has moved the actuation shaft 33 to an extended position by moving the first shaft element 36 directly and the second shaft element 35 indirectly via the hinge 37. The actuation shaft has raised the drive lever 31 which is connected to the rods 32. The rods follow the movement of the drive lever an drag the closing plates 11 behind them thus clearing the openings.

Figure 5A:
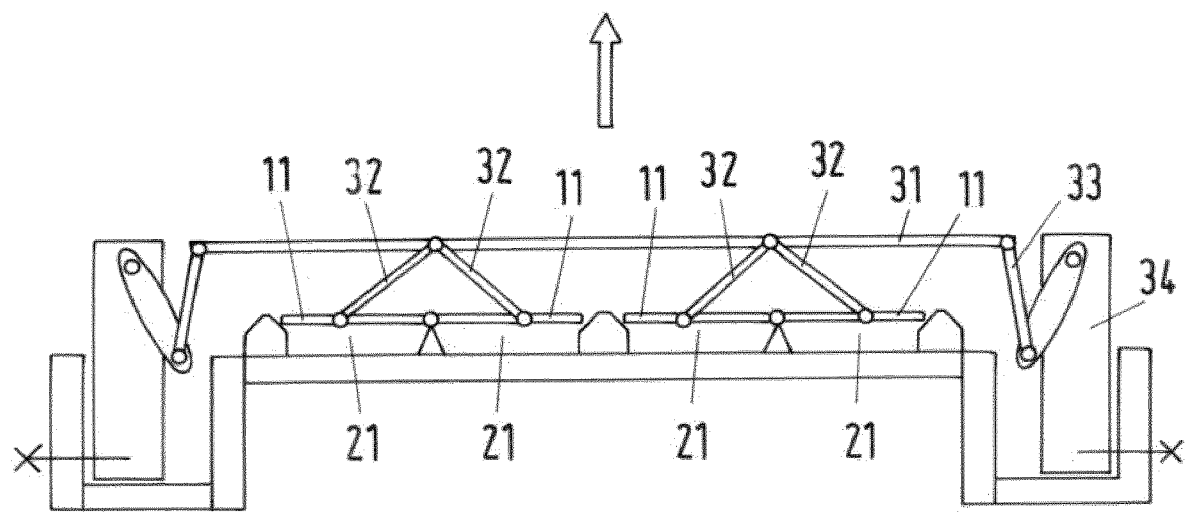
Figure 5B:
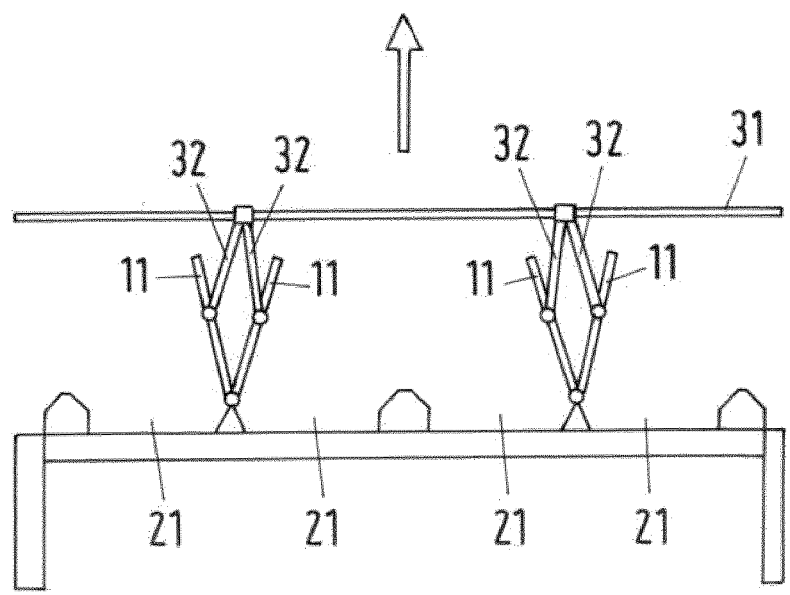

FIG. 5 shows a schematic drawing of a hinge mechanism in another embodiment in a side view. FIG. 5 a shows the active shutter in a close state. Four openings 21 are each closed by a closing plate 11. Each closing plate is attached to a rod 32. All four rods 32 are connected to the same drive lever 31 such that the closing plates 11 are moved in unison but in different directions. The drive lever 31 is connected to an actuation shaft 33 which has two shaft elements hinged to each other. The actuation shaft 33 is coupled to an actuator 34. FIG. 5*b* shows the same active shutter in an open state. The four closing plates 11 are in the open state giving the openings 21 free that air can flow through them. The actuation shaft has raised the drive lever 31 which is connected to the rods 32. The rods follow the movement of the drive lever an drag the closing plates 11 behind them thus clearing the openings.

The invention is not limited to one of the described embodiments, but can be modified in many ways. All features and advantages resulting from the claims, the description and the drawing, including constructional details, spatial arrangements and procedural steps, may be essential to the invention, both individually and in various combinations.

LIST OF REFERENCE SIGNS active aero shutter 10
frame 20
opening 21
closing plate 11
basic strut 22
point of intersection 24
middle strut 23
hinge 25
linear slider 26
mounting frame 27
hinge mechanism 30 drive lever 31
rod 32
actuation shaft 33
actuator 34
shaft element 35
shaft element 36
hinge 37
pivot point 38

What is claimed is:

1. An active aero shutter for a motor vehicle, comprising:
a frame with a plurality of openings through which air can flow, and
a plurality of closing plates in each opening of the plurality of openings, the plurality of closing plates configured to close the corresponding opening and stop the air flow through the corresponding opening,
wherein the frame is formed by a plurality of struts, each strut of the plurality of struts connected to at least one other strut of the plurality of struts, and
wherein:
the frame comprises a plurality of basic struts,
each closing plate of the plurality of closing plates is pivoted with a hinge on a corresponding basic strut of the plurality of basic struts, the plurality of closing plates comprising at least one closing plate, and
on each basic strut (22) a corresponding closing plate of the plurality of closing plates is mounted with the hinge and each strut of the plurality of struts forms a rotational axis for the corresponding closing plate, and
the rotational axes of two adjacent closing plates of plurality of closing plates are angled relative to each other, wherein the angle between the rotational axes corresponds to the angle between the plurality of struts.

2. The active aero shutter according to claim 1, wherein the plurality of basic struts comprises at least six basic struts, wherein each basic strut of the at least six basic struts intersects with one other basic struts of the at least six basic struts at a point of intersection, and the frame comprises at least six middle struts, which are each connected to at least one basic strut of the at least six basic struts at a point of intersection.

3. The active aero shutter according to claim 1, wherein each opening of the plurality of openings is built by three struts of the plurality of struts connected to each other forming a triangle.

4. The active aero shutter according to claim 3, wherein the triangle is an isosceles triangle.

5. The active aero shutter according to claim 1, wherein the frame is at least partially hexagonal in shape.

6. The active aero shutter according to claim 5, wherein the plurality of basic struts form a honeycomb structure.

7. The active aero shutter according to claim 1, wherein every two adjacent closing plates of plurality of closing plates have different rotational axes and rotate in two different directions.

8. The active aero shutter according to claim 1, wherein the closing plates of the plurality of closing plates have the same shape as the plurality of openings and each opening of the plurality of openings is closed by one closing plate of the plurality of closing plates.

9. The active aero shutter according to claim 1, wherein each closing plate of the plurality of closing plates is connected independently to an opening device.

10. The active aero shutter according to claim 9, wherein the opening device is a linear slider.

11. The active aero shutter according to claim 9, wherein the opening device is a hinge mechanism having at least one drive lever and at least one rod and each closing plate of the plurality of closing plates is connected by a corresponding rod to a corresponding drive lever.

12. The active aero shutter according to claim 11, wherein the hinge mechanism further comprises an actuation shaft which is connected to an actuator and the corresponding drive lever is on one end connected to the actuation shaft.

13. The active aero shutter according to claim 11, wherein the at least one drive lever is one drive lever and all closing plates of the plurality of closing plates are connected to the one drive lever and the one drive lever conducts a linear motion to close and open all closing plates of the plurality of closing plates.

14. The active aero shutter according to claim 11, wherein the at least one drive lever is two drive levers that are mounted on opposite sides of the active aero shutters.

15. The active aero shutter according to claim 11, wherein each closing plate of the plurality of closing plates is connected independently by the corresponding rod to the corresponding drive lever.

* * * * *